Oct. 31, 1950 — L. DRANGLE — 2,527,919
CHEESE AND CRACKER PACKAGE
Filed April 20, 1948
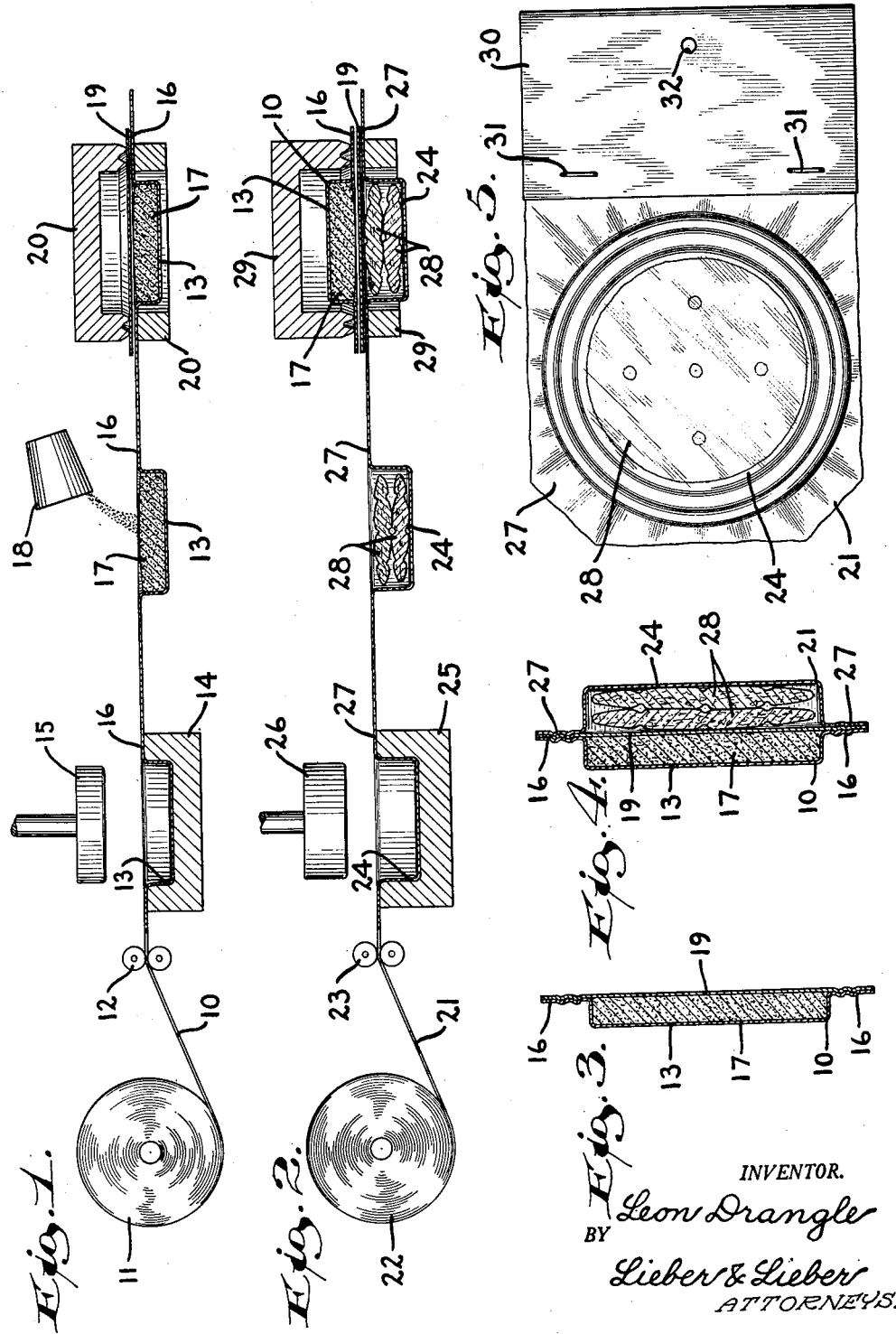
INVENTOR.
Leon Drangle
BY Lieber & Lieber
ATTORNEYS.

Patented Oct. 31, 1950

2,527,919

UNITED STATES PATENT OFFICE 2,527,919

CHEESE AND CRACKER PACKAGE

Leon Drangle, Gilman, Wis.

Application April 20, 1948, Serial No. 22,158

2 Claims. (Cl. 99—171)

My present invention relates generally to improvements in the art of packaging and merchandising food commodities, and relates more particularly to improvements in the construction and use of cheese and cracker packages and the like of the type disclosed generally in the abandoned application of Leon Drangle and Harold C. Didrickson, Serial No. 731,928, filed March 3, 1947.

Numerous types of packages and containers for receiving diverse commodities have heretofore been proposed. As far as known, however, no attempt has ever heretofore been made by others, except in the manner disclosed in the application hereinabove identified, to merchandise the ingredients of individual servings of cheese and crackers in a sealed container, primarily because of the lack of a satisfactory commercial package. While the application, Serial No. 731,928, discloses a package adapted to house and attractively display the ingredients of a single cheese and cracker sandwich, such packages have not proven entirely commercially successful because of the failure to adequately seal the relatively fragile commodities from the atmosphere and to provide means for preventing breakage of the crackers.

It is, therefore, a primary object of this invention to provide an improved simple, compact and highly attractive cheese and cracker package which obviates the disadvantages heretofore presented, and an improved method of producing such packages in large quantities in a most expeditious manner.

Another important object of the present invention is to provide an improved method of packaging cheese and crackers in individual servings for merchandising in a novel, sanitary and attractive manner.

Another specific object of the invention is to provide an improved and tightly sealed cheese and cracker package which is extremely durable and sanitary in construction and highly flexible in its adaptations, and which may moreover be readily produced of available materials in rapid succession and at low cost in accordance with a simple and efficient method.

Still another important object of this invention is to provide an improved hermetically sealed unitary package for a plurality of commodities, such as the ingredients of an individual cheese and cracker snack or sandwich, housed and attractively displayed within separate zones in a sanitary and protected manner.

A further specific object of my present invention is to provide an improved and novel package for individual servings of cheese and crackers which is sufficiently durable to withstand considerable handling and abuse and wherein the packaged commodities are exceedingly well-protected against possible crushing and deterioration from exposure.

An additional important specific object of the present invention is to provide an improved simple and efficient method of producing novel and distinctive merchandising containers and for quickly and easily supplying the same with individual servings or snacks of cheese and crackers.

These and other specific objects and advantages of the invention will be apparent from the following detailed description.

A clear conception of the features constituting my present improvement, and of the construction of cheese and cracker packages embodying the invention and the steps in my improved method of commercially producing the same, may be had by referring to the drawing accompanying and forming a part of this specification wherein like reference characters designate the same or similar parts in the several views.

Fig. 1 is a diagrammatic part-sectional side view of a typical installation adapted to perform the initial steps of packaging and sealing successive individual batches of cheese;

Fig. 2 is a similar diagrammatic part-sectional side view of an installation adapted to similarly perform the successive steps of packaging individual batches of crackers and of finally producing the packs;

Fig. 3 is a transverse vertical section through one of the confined cheese batches produced and packaged by the initial steps illustrated in Fig. 1;

Fig. 4 is a similar transverse vertical section through one of the completed cheese and cracker packages as finally produced by the steps illustrated in Fig. 2; and Fig. 5 is a plan view of one of the completed packages as viewed from the cracker side of the pack.

While the invention has been shown and described herein as applied to and embodied in a typical package containing a single batch of cheese and two crackers of a particular type, it is not my desire or intention to thereby unnecessarily restrict or limit the scope or utility thereof, since the improved structure and method are also applicable for packaging other commodities and the shapes and numbers of the ingredients may be varied as desired.

In accordance with my present improved method of producing the novel packages adapted to house individual servings of cheese and crackers, I initially form a cup in a sheet of heat-sealable material to provide a flange projecting laterally from the cup brim. Then, I fill the cup with a batch of cheese to a point substantially flush with the brim of the cup. Next, an approximately flat sheet of heat-sealable material is placed over the cup brim so as to span the cup and the two sheets are sealed outwardly of and entirely about the cup by application of heat and pressure. Thereafter, a cup may be formed in a third sheet of heat-sealable material to provide another laterally projecting flange on the second mentioned cup. A pair of crackers is then placed within the second cup in superimposed condition. Finally, the packaged cheese batch is inverted and placed over the cracker-containing sheet with the flat sheet adjacent the flange of the cracker containing sheet, and the superimposed sheets are sealed entirely about both cups by application of heat and pressure to provide a final package having the cheese segregated from the crackers by an intervening flat wall.

In carrying on commercial exploitation of my improved package producing method, an installation substantially as shown diagrammatically in the drawing may be utilized to rapidly and effectively produce successive completed packages. Referring particularly to Figs. 1 and 2 of the drawing, the initial relatively thin and flexible sheet 10 of heat-sealable material may be supplied from a rotatably supported roll 11 from which the sheet 10 may be withdrawn by a set of draw rolls 12 or the like. The sheet 10 may then be provided with a series of spaced cups 13 through use of a socketed member 14 and a cooperating plunger 15 which may be caused to intermittently act on the sheet 10 in an obvious manner, forming successive cups 13 each provided with an annular flange 16 projecting laterally from the cup brim. Each of the successive cups 13 is then filled with a batch of cheese 17 to a point substantially flush with the brim thereof in any suitable manner, as with the aid of a ladle 18 or the like. To enclose and confine the cheese batches 17 within their respective cups 13 and thereby provide a cheese package, a substantially flat sheet 19 of heat-sealable material is placed over the brim of each of the successive cups 13 so as to span the cup and cheese patty 17, and the sheets 10, 19 may be sealed outwardly of and entirely about each cup 13 by application of heat and pressure through use of a suitable heat sealing device 20. The cracker confining portion of the package may be produced in a similar manner with a third sheet 21 of relatively thin and flexible heat-sealable stock being supplied from a rotatably supported roll 22 with the aid of a set of draw rolls 23 or the like, the sheet 21 being provided with a series of spaced cups 24 by the coaction of a socketed member 25 and an intermittently operating plunger 26 which forms successive cups 24 each having an annular flange 27 projecting laterally from the cup brim. Each of the successive cups 24 is thereafter supplied with one or more crackers 28, shown as two in the drawing, and these crackers 28 are inserted in superimposed condition either by machine or by hand. Finally, the packaged cheese batches, produced in accordance with the steps illustrated in Fig. 1 and hereinabove described, are inverted, and one of the inverted packaged batches is placed with the flat confining sheet 19 thereof directly over each of the successive cracker containing cups 24 so that the cheese patty 17 and the crackers 28 are coaxially disposed upon sealing of the superimposed sheets 10, 19, 21 outwardly of and entirely about each of the cups 13, 24 by application of heat and pressure with the aid of a suitable heat sealing device 29 adapted to coact with the flanges 16, 27 of the cups 13, 24 respectively.

Obviously, the package produced in accordance with the improved method through utilization of an installation such as hereinabove described provides a final container or pack wherein the ingredients of a single cheese and cracker sandwich are housed within separate zones, the cheese batch or patty 17 being segregated from the cracker or crackers 28 by an intervening wall formed by the sheet 19. The flanges 16, 27 of the respective sheets 10, 21 and the intervening sheet 19 may be cut to any desired shape or size, either circular, polygonal or otherwise; and each package may be provided with an end tab 30 or the like which may consist of a folded sheet stapled as at 31 or otherwise secured to the flanges 16, 27. The tab 30 may be provided with printed advertising indicia or the like and may also have a hook-receiving hole 32 formed therein to provide a convenient means for hanging the package from a display rack or the like.

Referring particularly to Figs. 3, 4, and 5, the improved package resulting from the method hereinabove described comprises, in general, an outer sheet 10 of relatively flexible material provided with a cup-shaped portion 13 surrounded by a laterally extending flange 16; a batch of cheese 17 confined within the cup 13 of the sheet 10; a substantially flat sheet 19 of flexible material disposed over the sheet 10 so as to span the cup 13 and enclose the cheese batch 17 therein, the flat sheet 19 being adhesively united to the flange 16 entirely about the cup 13 to provide a cheese confining pack as shown in Fig. 3; another sheet 21 of flexible material also provided with a similar cup-shaped portion 24 surrounded by a laterally extending flange 27; and one or more superimposed crackers 28 confined within the cup 24 of the sheet 21, the sheet 21 being disposed with the opening of the cup 24 adjacent the exposed surface of the flat sheet 19 and with the cup 24 disposed coaxially of the cup 13 of the sheet 10, the flange 27 of the sheet 21 also being adhesively united to the flat sheet 19 to provide a sealed cheese and cracker package. As hereinabove indicated, a suitable end tab 30 may also be provided, and such tab may be secured to the flanges 16, 27 by means of staples 31 or the like and may be provided with a hook-receiving opening 32.

From the foregoing detailed description, it is apparent that my present invention provides an improved sealed cheese and cracker package which is simple, compact and durable in construction, and which is moreover adapted to be readily produced in a rapid manner in accordance with a novel and effective method. Since the cheese patty 17 and the crackers 28 are superimposed and concentrically retained in a common package assembly, these commodities serve to protect each other, thereby minimizing the possibilities of breakage; and the packaged commodities 17, 28 are moreover effectively housed within separate zones and are entirely sealed from each other and from the atmosphere to provide maximum protection from possible deterioration. By utilizing the steps of the improved method in producing the packages, the rate of production thereof may be enhanced to a maximum at a minimum cost; and the packages thus produced provide a novel sanitary and attractive means of merchandising cheese and crackers in individual servings. The shape and size of the cups 13, 24 as well as the configuration of the flanges 16, 27 may be varied as desired, and any number of crackers 28 may be confined within the cup 24. The packages may be produced from sheets of any suitable material other than a heat-sealable material in rapid succession to provide a durable and sanitary commodity container which is furthermore highly attractive for purposes of display. The improved packages and the end tabs 30 may obviously be decorated by printing or otherwise, and the packages have proven highly satisfactory in actual use.

It should be understood that it is not desired to limit this invention to the exact steps of the method or to the precise details of construction or mode of use of the packages herein shown and described, since various modifications within the scope of the appended claims may occur to persons skilled in the art to which this invention pertains; and it is also contemplated that specific descriptive terms used herein be given the broadest possible interpretation consistent with the disclosure.

I claim:

1. A cheese and cracker package comprising, a pair of cup-shaped reversely disposed compartments formed of flexible wrapper stock and each having a cylindrical wall stiffened remote from its cup-brim by an integral flat diaphragm bottom and likewise stiffened at said brim by an integral flat outwardly extending polygonal flange, a solid slab of cheese completely filling one of said compartments, one or more fragile crackers loosely confined within the other compartment, and a compartment segregating and closure sheet interposed between and secured to both of said brim flanges to coaxially position said cylindrical walls, said closure sheet and said cheese slab further stiffening and preventing deformation of the cylindrical cracker confining wall.

2. A cheese and cracker package comprising, a pair of cup-shaped reversely disposed compartments formed of flexible wrapper stock and each having a cylindrical wall stiffened remote from its cup-brim by an integral flat diaphragm bottom and likewise stiffened directly at said brim by an integral flat outwardly extending flange, a solid slab of cheese completely filling one of said compartments, one or more fragile crackers loosely confined within the other compartment, and a compartment segregating and closure sheet interposed between and secured to both of said brim flanges and being formed to coaxially position said cylindrical walls, said closure sheet and said cheese slab further stiffening and preventing deformation of the cylindrical cracker confining wall when said compartments have been axially alined.

LEON DRANGLE.

REFERENCES CITED

The following references are of record in the file of this patent:

UNITED STATES PATENTS

| Number | Name | Date |
| --- | --- | --- |
| 1,077,835 | Kelly | Nov. 4, 1913 |
| 1,647,289 | Gwinn | Nov. 1, 1927 |
| 1,889,882 | Woods | Dec. 6, 1932 |
| 1,983,685 | Townsley | Dec. 11, 1934 |
| 2,245,738 | Taylor | June 17, 1941 |
| 2,372,406 | Treneer | Mar. 27, 1945 |
| 2,377,118 | Weisman | May 29, 1945 |
| 2,401,110 | Rohdin | May 28, 1946 |

FOREIGN PATENTS

| Number | Country | Date |
| --- | --- | --- |
| 21,679 of 1909 | Great Britain | Apr. 14, 1910 |